US008868638B2

(12) United States Patent
Scoda

(10) Patent No.: US 8,868,638 B2
(45) Date of Patent: Oct. 21, 2014

(54) METHODS FOR REDUCING LATENCY IN NETWORK CONNECTIONS USING AUTOMATIC REDIRECTS AND SYSTEMS THEREOF

(75) Inventor: Enrico Scoda, Matignacco (IT)

(73) Assignee: Usablenet Inc., New York, NY (US)

( * ) Notice: Subject to any disclaimer, the term of this patent is extended or adjusted under 35 U.S.C. 154(b) by 583 days.

(21) Appl. No.: 13/135,707

(22) Filed: Jul. 13, 2011

(65) Prior Publication Data

US 2012/0117270 A1 May 10, 2012

Related U.S. Application Data

(63) Continuation-in-part of application No. 12/927,169, filed on Nov. 9, 2010.

(51) Int. Cl.
G06F 15/16 (2006.01)
G06F 15/173 (2006.01)
H04L 29/08 (2006.01)

(52) U.S. Cl.
CPC ............ *H04L 67/2814* (2013.01); *H04L 67/02* (2013.01)
USPC ............................ 709/202; 709/219; 709/244

(58) Field of Classification Search
CPC ...... H04L 67/04; H04L 67/2814; H04L 67/28
USPC .......... 709/202, 217, 219, 241, 244, 238, 239
See application file for complete search history.

(56) References Cited

U.S. PATENT DOCUMENTS 7,136,930 B1 * 11/2006 Leppinen ...................... 709/238
2002/0023159 A1 2/2002 Vange et al.
2003/0185197 A1 * 10/2003 Banerjee et al. .............. 370/351
2004/0073867 A1 4/2004 Kausik et al.
2005/0060410 A1 3/2005 Wu et al.
2006/0021004 A1 1/2006 Moran et al.

(Continued)

OTHER PUBLICATIONS

International Search Report for International Patent Application No. PCT/US2011/059994, (Jun. 29, 2012).

*Primary Examiner* — Madhu Woolcock
(74) *Attorney, Agent, or Firm* — LeClairRyan, a Professional Corporation

(57) ABSTRACT

A method, computer readable medium, and apparatus for reducing latency in network connections include receiving at a web content optimization apparatus a request from one of one or more client devices for network content hosted at one of one or more server devices. The web content optimization apparatus determines whether an automatic redirect parameter is enabled for the request. The request from one proxy processing device acting as the requesting one of the client devices within the web content optimization apparatus is sent to another proxy processing device within the web content optimization apparatus when the automatic redirect parameter is determined to be enabled. One or more redirect messages with one or more optimized cookies associated with the requested network resource are obtained from the one or more server devices at the another proxy processing device within the web content optimization apparatus. The last of the one or more redirects messages with the one or more optimized cookies when the requested network resource is located is sent from the another proxy processing device within the web content optimization apparatus to the one proxy processing device within the web content optimization apparatus. The last of the one or more redirect messages with the one or more optimized cookies associated with the requested network resource is sent from the web content optimization apparatus to the requesting one of the one or more of client devices.

19 Claims, 5 Drawing Sheets

(56) References Cited

U.S. PATENT DOCUMENTS

| | | |
|---|---|---|
| 2006/0168129 A1* | 7/2006 | Van Geest et al. ............ 709/219 |
| 2006/0168349 A1* | 7/2006 | Van Geest et al. ............ 709/247 |
| 2006/0294223 A1 | 12/2006 | Glasgow et al. |
| 2007/0073878 A1 | 3/2007 | Issa |
| 2007/0174193 A1 | 7/2007 | Quan et al. |
| 2008/0172488 A1 | 7/2008 | Jawahar et al. |
| 2008/0270223 A1 | 10/2008 | Collins et al. |
| 2008/0288458 A1 | 11/2008 | Sun et al. |
| 2008/0307517 A1 | 12/2008 | Grigoriev et al. |
| 2009/0077205 A1 | 3/2009 | Quinet et al. |
| 2010/0131639 A1 | 5/2010 | Narayana et al. |
| 2010/0132031 A1 | 5/2010 | Zheng |
| 2010/0198911 A1 | 8/2010 | Zhang et al. |
| 2010/0223355 A1 | 9/2010 | Yang et al. |
| 2010/0242092 A1 | 9/2010 | Harris et al. |
| 2010/0319056 A1 | 12/2010 | Gillum et al. |
| 2012/0036178 A1 | 2/2012 | Gavini et al. |

\* cited by examiner

METHODS FOR REDUCING LATENCY IN NETWORK CONNECTIONS USING AUTOMATIC REDIRECTS AND SYSTEMS THEREOF

This application is a continuation-in-part of prior application Ser. No. 12/927,169, filed Nov. 9, 2010, which is herein incorporated by reference in its entirety.

FIELD

This technology generally relates to web content optimization apparatuses and, more particularly, to methods and systems for reducing latency in network connections using automatic redirects in web content optimization apparatuses.

BACKGROUND

When a client device connects to a server (e.g., a web server, or a content server) to get a network resource using a network protocol, e.g., the Hyper-text Transfer protocol (HTTP), the server responds by sending the network resource or by sending a redirect message back to the client device over a communication channel. If the client device receives a redirect message, it will need to send a new request to the server based upon the redirect message, and the server will again respond with a redirect or a real resource. This communication process between the client device and the server repeats until the client device is able to get the resource, if available.

However, when the client device, e.g., a cell phone using a radio network, or a computer having a slow Internet connection, requests a network resource and has to perform more than one redirects to obtain the network resource, the client device will experience substantial delay and will spend a considerable amount of time to execute the whole process before finally being provided with the network resource. The delay can occur, for example, because of a large time to establish a connection and send the HTTP request, also referred to as latency time of radio networks or other slow network connections (e.g., Internet via a dial-up connection). Unfortunately, this delay can often lead to the client device not being able to obtain the network resource at all, or the client device giving up or relinquishing attempts to obtain the network resource under time constraints.

One conventional solution built to obtain faster HTTP responses for slow connection networks utilizes one or more proxy server devices (e.g., web proxy servers). Another conventional solution utilizes telephone carrier data centers that handle the network traffic for each client device by handling one or more requests when the client device is a mobile telephone, or a mobile personal digital assistant (PDA) device, for example. Unfortunately, the above-noted conventional solutions do not resolve the redirection problem associated with network resources stored on the servers since the redirect messages are forwarded on to the client devices for handling resulting in multiple back and forth communication between the client devices and the servers.

SUMMARY

A method for reducing latency in network connections includes receiving at an optimization apparatus a request from one of one or more client devices for network content hosted at one of one or more server devices. The optimization apparatus determines whether an automatic redirect parameter is enabled for the request. The request from one proxy processing device acting as the requesting one of the client devices within the optimization apparatus is sent to another proxy processing device within the optimization apparatus when the automatic redirect parameter is determined to be enabled. One or more redirect messages with one or more optimized cookies associated with the requested network resource are obtained from the one or more server devices at the other proxy processing device within the web content optimization apparatus. The last of the one or more redirects messages with the one or more optimized cookies when the requested network resource is located is sent from the other proxy processing device within the optimization apparatus to the one proxy processing device within the optimization apparatus. The last of the one or more redirect messages with the one or more optimized cookies associated with the requested network resource is sent from the optimization apparatus to the requesting one of the one or more of client devices.

A non-transitory computer readable medium having stored thereon instructions for reducing latency in network connections comprises machine executable code which when executed by at least one processor, causes the processor to perform steps including receiving a request from one of one or more client devices for network content hosted at one of one or more server devices. A determination is made whether an automatic redirect parameter is enabled for the request. The request from one proxy processing device acting as the requesting one of the client devices within an optimization apparatus is sent to another proxy processing device within the optimization apparatus when the automatic redirect parameter is determined to be enabled. One or more redirect messages with one or more optimized cookies associated with the requested network resource is obtained from the one or more server devices at the other proxy processing device within the optimization apparatus. The last of the one or more redirects messages with the one or more optimized cookies when the requested network resource is located is sent from the other proxy processing device within the optimization apparatus to the one proxy processing device within the optimization apparatus. The last of the one or more redirect messages with the one or more optimized cookies associated with the requested network resource is sent to the requesting one of the one or more of client devices.

An apparatus configured to reduce latency in network connections comprising one or more processors and a memory coupled to the one or more processors configured to execute programmed instructions stored in the memory including receiving a request from one of one or more client devices for network content hosted at one of one or more server devices. A determination is made whether an automatic redirect parameter is enabled for the request. The request from one proxy processing device acting as the requesting one of the client devices within an optimization apparatus is sent to another proxy processing device within the optimization apparatus when the automatic redirect parameter is determined to be enabled. One or more redirect messages with one or more optimized cookies associated with the requested network resource is obtained from the one or more server devices at the other proxy processing device within the optimization apparatus. The last of the one or more redirects messages with the one or more optimized cookies when the requested network resource is located is sent from the other proxy processing device within the optimization apparatus to the one proxy processing device within the optimization apparatus. The last of the one or more redirect messages with the one or more optimized cookies associated with the requested network resource is sent to the requesting one of the one or more of client devices.

This technology provides a number of advantages including providing a method, computer readable medium and apparatus that efficiently manages the whole redirect chain on behalf of the client device by optimizing at least a portion of redirect messages automatically within a web content optimization apparatus. Since at least a portion of the redirect chain associated with locating and obtaining the network resource is handled internally by separate processing devices within the web content optimization apparatus, network communications between the client devices and the servers for network resources are sped up. This technology exploits the faster internal processing of redirect messages in one or more redirect chains by the web content optimization apparatus, as compared to slower communication speeds between client device and the servers.

DETAILED DESCRIPTION

Figure 1:
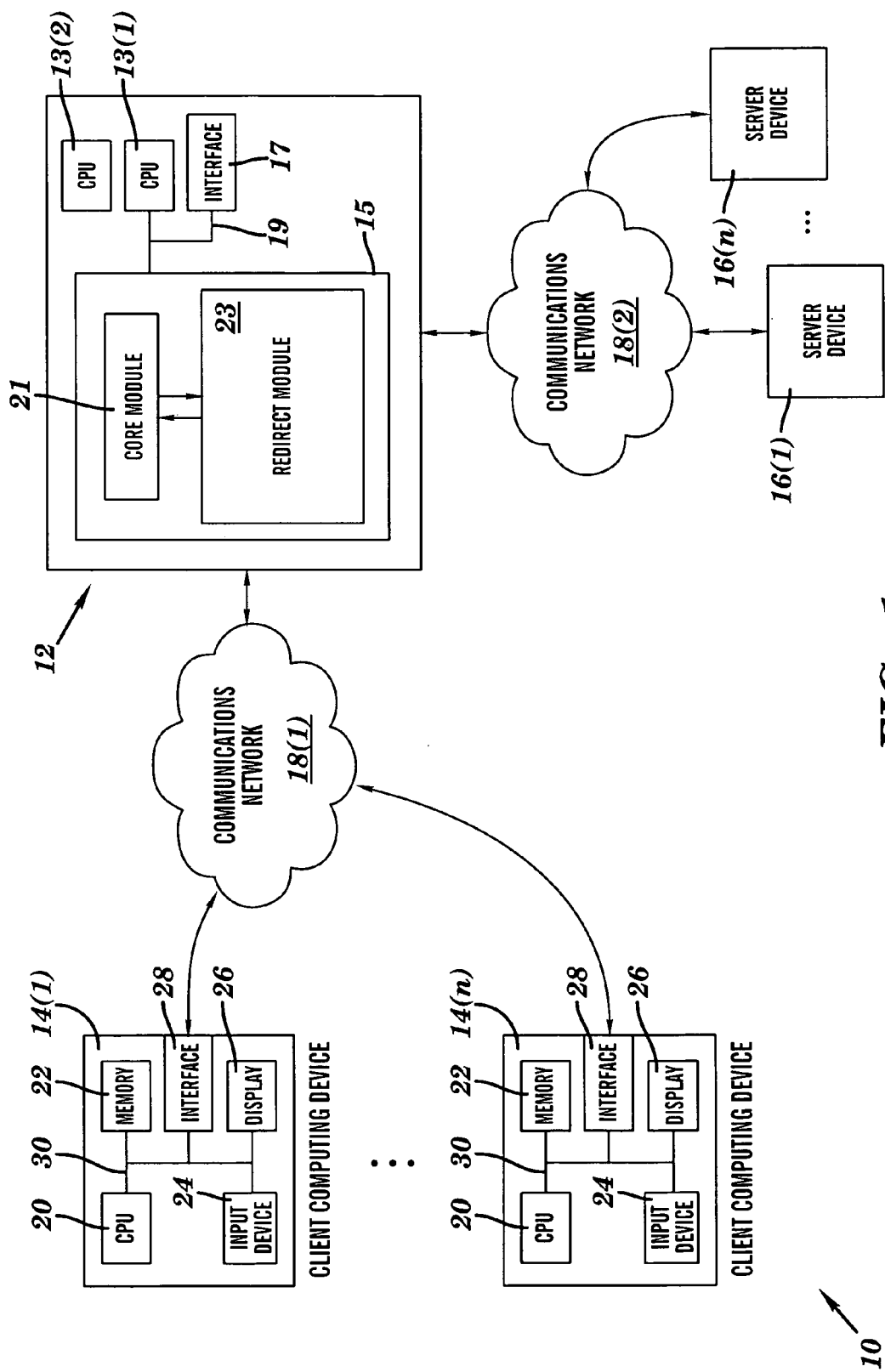
FIG. 1 is a block diagram of an exemplary network environment with a web content optimization apparatus interposed between client devices and server devices.

An exemplary environment 10 in which a web content optimization apparatus 12 is optimized for reducing latency in network connections is illustrated in FIG. 1. The exemplary environment 10 includes the web content optimization apparatus 12, client devices 14(1)-14(n), server devices 16(1)-16(n), and communication networks 18(1)-18(2), although other numbers and types of systems, devices, and/or elements in other configurations and environments with other communication network topologies can be used. This technology provides a number of advantages including providing a method, computer readable medium, and an apparatus that reduces latency in network connections, for example, HTTP connections.

Referring more specifically to FIG. 1, the web content optimization apparatus 12 manages handling of redirect messages or redirection responses from the server devices 16(1)-16(n) for and/or on behalf of requesting client devices 14(1)-14(n) and provides updated cookie information to the client devices 14(1)-14(n) for future requests for network resources from the client devices 14(1)-14(n), although the web content optimization apparatus 12 can provide other numbers and types of functions and other types of processing devices can be used. Although one web content optimization apparatus 12 is shown, other numbers and types of optimization devices and systems can be used.

The web content optimization apparatus 12 includes central processing units (CPU) or processors 13(1) and 13(2), a memory 15, and an interface system 17 which are coupled together by a bus 19 or other link, although other numbers and types of components, parts, devices, systems, and elements in other configurations and locations can be used. The processors 13(1) and 13(2) in the web content optimization apparatus 12 executes a program of stored instructions to carry out or perform one or more aspects of the present invention as described and illustrated by way of the embodiments herein, although other numbers of processors can be used and one or more of the processors could execute other numbers and types of programmed instructions.

The memory 15 in the web content optimization apparatus 12 stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processors 13(1) and 13(2), can be used for the memory 15 in the web content optimization apparatus 12. In these embodiments, the memory 15 includes a core module 21 and a redirect module 23 which store programmed instructions for one or more aspects of the present invention as described and illustrated herein, although the memory can comprise other types and numbers of systems, devices, and elements in other configurations which store other data.

The interface system 17 in the web content optimization apparatus 12 is used to operatively couple and communicate between the web content optimization apparatus 12 and the client devices 14(1)-14(n) and the server devices 16(1)-16(n) via the communication networks 18(1) and 18(2), although other types and numbers of communication networks with other types and numbers of connections and configurations can be used. By way of example only, the communication networks 18(1) and 18(2) can use TCP/IP over Ethernet and industry-standard protocols, including HTTP, HTTPS, WAP, and SOAP, although other types and numbers of communication networks, such as a direct connection, a local area network, a wide area network, modems and phone lines, e-mail, and wireless and hardwire communication technology, each having their own communications protocols, can be used. In one exemplary embodiment, one of communication networks 18(1) and 18(2) can be operating over one or more low-speed connections (e.g., a dial-up connection) while the other one of the communication networks 18(1) and 18(2) can be operating over a high speed, high bandwidth connection (e.g., optical fiber based communication network). In yet another exemplary embodiment, one or more of communication networks 18(1) and 18(2) can be a radio network, a satellite network, an Internet connection, a wired cable network, or combinations thereof, well known to one of ordinary skill in the art reading this disclosure.

Each of the client devices 14(1)-14(n) enables a user to request, obtain, and interact with one or more network resources, e.g., web pages from one or more web sites, hosted by server devices 16(1)-16(n) through the web content optimization apparatus 12 via one or more communication networks (e.g., communication network 18(1)), although one or more of the client devices 14(1)-14(n) could access content and utilize other types and numbers of applications from other sources and could provide a wide variety of other functions for the user. Although multiple client devices 14(1)-14(n) are shown, other numbers and types of user computing systems could be used. In one example, the client devices 14(1)-14(n) comprise mobile devices with Internet access that permit a website form page or other retrieved data that is a part of a requested network resource to be displayed, although each of the client devices 14(1)-14(n) can connect to server devices 16(1)-16(n) via other types of network connections directly or indirectly, depending upon specific scenarios, as can be contemplated by one of ordinary skill in the art, after reading this disclosure. By way of example only, one or more of the client devices 14(1)-14(n) can comprise smart phones, personal digital assistants, computers, or other computing devices.

Each of client devices 14(1)-14(n) in this example is a computing device that includes a central processing unit (CPU) or processor 20, a memory 22, user input device 24, a display 26, and an interface system 28, and which are coupled together by a bus 30 or other link, although one or more of client devices 14(1)-14(n) can include other numbers and types of components, parts, devices, systems, and elements in other configurations. The processor 20 in each of client devices 14(1)-14(n) executes a program of stored instructions for aiding one or more aspects of the present invention as described and illustrated herein, although the processor could execute other numbers and types of programmed instructions.

The memory 22 in each of the client devices 14(1)-14(n) stores these programmed instructions for one or more aspects of the present invention as described and illustrated herein as well as other data, such as updated cookies associated with a network resource and received as part of one or more redirect chains forwarded by web content optimization apparatus 12, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to processor 20 can be used for the memory 22 in each of the client devices 14(1)-14(n).

The user input device 24 in each of the client devices 14(1)-14(n) is used to input selections, such as requests for a network resource, e.g., a particular website form page or to enter data in fields of a form page, although the user input device could be used to input other types of data and interact with other elements of exemplary environment 10. The user input device 24 can include keypads, touch screens, and/or vocal input processing systems, although other types and numbers of user input devices can be used.

The display 26 in each of the client devices 14(1)-14(n) is used to show data and information to the user, such as requested website page by way of example only. The display in each of the client devices 14(1)-14(n) is a mobile phone screen display, although other types and numbers of displays could be used depending on the particular type of client device, as can be contemplated by one of ordinary skill in the art, after reading this disclosure.

The interface system 28 in each of the client devices 14(1)-14(n) is used to operatively couple and communicate between the client devices 14(1)-14(n) and the web content optimization apparatus 12 and server devices 16(1)-16(n) over the communication networks 18(1) and 18(2), although other types and numbers of communication networks with other types and numbers of connections and configurations can be used.

The server devices 16(1)-16(n) provide one or more pages from one or more web sites for use by one or more of the client devices 14(1)-14(n) via the web content optimization apparatus 12, although the server devices 16(1)-16(n) can provide other numbers and types of applications and/or content and can have provide other numbers and types of functions. Although server devices 16(1)-16(n) are shown for ease of illustration and discussion, other numbers and types of server systems, for example, web servers, and devices can be used. In one example, server devices 16(1)-16(n) can be web servers having dedicated hardware with software executing on the dedicated hardware to facilitate the web content optimization apparatus 12 and client devices 14(1)-14(n) in their functioning. In another example, server devices 16(1)-16(n) can be content servers that are configured to deliver network resources stored thereupon using the HTTP protocol, or other network protocols for example. Content stored on server devices 16(1)-16(n) that can be part of the network resources requested by client devices 14(1)-14(n) can be web pages, electronic files and documents, configuration data, metadata, or other network data and files, by way of example only and not by way of limitation.

Each of the server devices 16(1)-16(n) include a central processing unit (CPU) or processor, a memory, and an interface system which are coupled together by a bus or other link, although each of the server devices 16(1)-16(n) could have other numbers and types of components, parts, devices, systems, and elements in other configurations and locations can be used. The processor in each of the server devices 16(1)-16(n) executes a program of stored instructions one or more aspects of the present invention as described and illustrated by way of the embodiments herein, although the processor could execute other numbers and types of programmed instructions. When one of the server devices 16(1)-16(n) does not store the requested content, the server device may respond by sending a redirect message to the web content optimization apparatus 12.

The memory in each of the server devices 16(1)-16(n) stores these programmed instructions for one or more aspects of the present invention as described and illustrated by way of the embodiments, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory in each of the server devices 16(1)-16(n).

The interface system in each of the server devices 16(1)-16(n) is used to operatively couple and communicate between the server devices 16(1)-16(n) and the web content optimization apparatus 12 and the client devices 14(1)-14(n) via communication networks 18(1) and 18(2), although other types and numbers of communication networks with other types and numbers of connections and configurations can be used.

Although embodiments of the web content optimization apparatus 12, the client devices 14(1)-14(n), and the server devices 16(1)-16(n), are described and illustrated herein, each of the client devices 14(1)-14(n), the web content optimization apparatus 12, and the server devices 16(1)-16(n), can be implemented on any suitable computer system or computing device. It is to be understood that the devices and systems of the embodiments described herein are for exemplary purposes, as many variations of the specific hardware and software used to implement the embodiments are possible, as will be appreciated by those skilled in the relevant art(s).

Furthermore, each of the systems of the embodiments may be conveniently implemented using one or more general purpose computer systems having non-transitory computer readable medium, microprocessors, digital signal processors, and micro-controllers, programmed according to the teachings of the embodiments, as described and illustrated herein, and as will be appreciated by those ordinary skill in the art.

In addition, two or more computing systems or devices can be substituted for any one of the systems in any embodiment of the embodiments. Accordingly, principles and advantages of distributed processing, such as redundancy and replication also can be implemented, as desired, to increase the robustness and performance of the devices and systems of the embodiments. The embodiments may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as non-transitory computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

Figure 2:
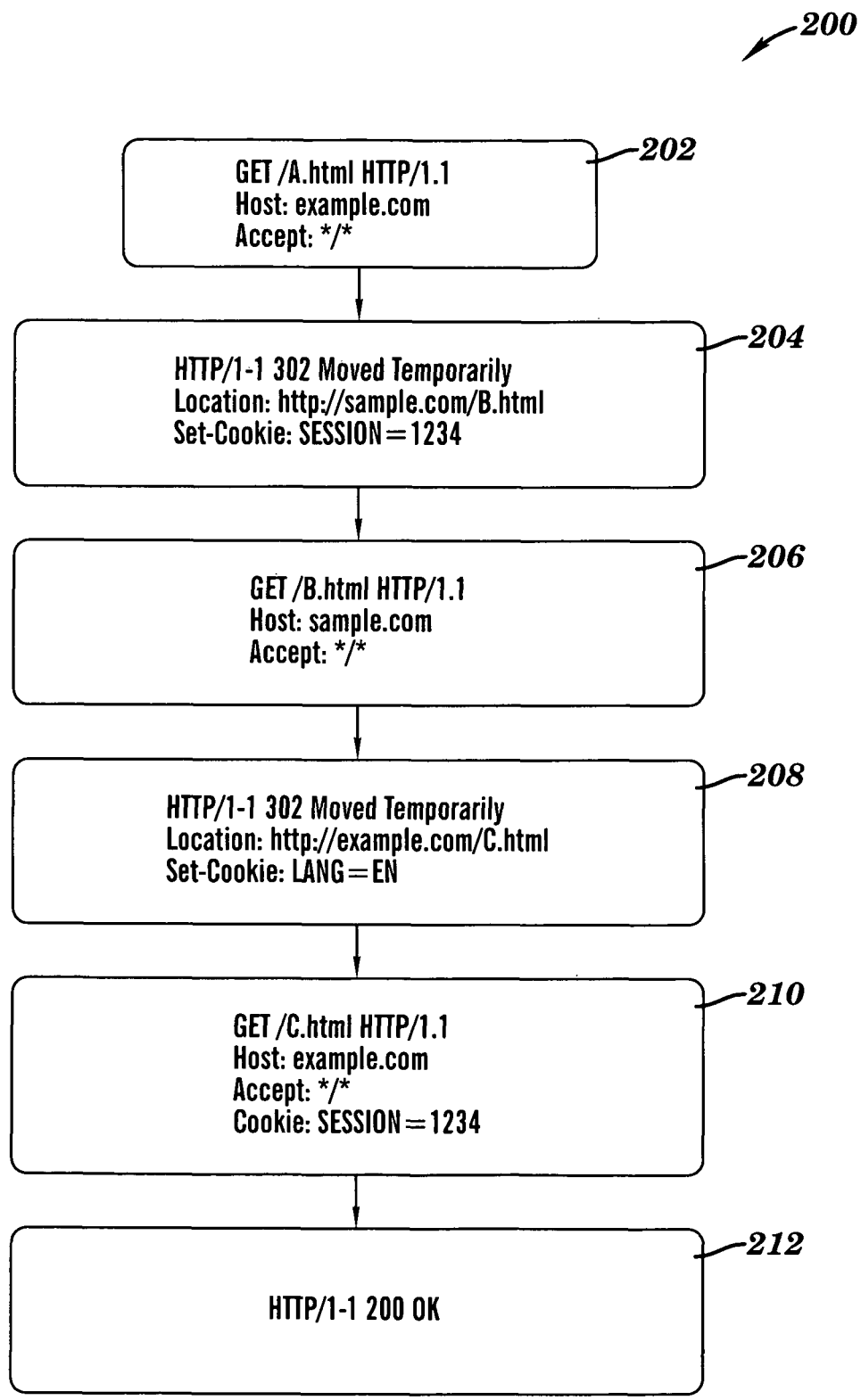
FIG. 2 is a flow chart of a method for processing an exemplary sequence of HTTP requests and responses between one of the client devices and the server devices hosting example.com and sample.com.

Referring to FIG. 2, an exemplary method 200 for processing an exemplary sequence of HTTP requests and responses between one of the client devices 14(1)-14(n) and the server devices 16(1)-16(n) hosting example.com and sample.com without a the web content optimization apparatus is illustrated. It is to be noted that the sequence of steps for the method 200 is only exemplary and one of ordinary skill in the art, after reading this disclosure, can contemplate alternative sequences of steps that achieve substantially the same result.

More specifically, at step 202 one of the client devices 14(1)-14(n) (e.g., a mobile device) sends an HTTP request: GET/A.html HTTP/1.1 for a network resource at a Uniform Resource Locator (URL) http://www.example.com/A.html, although other types of requests for other types of network resources may be sent. Although in this example one of the client devices 14(1)-14(n) via a web browser requests a page A.html at the URL, "www.example.com" as shown, by way of example only, client devices 14(1)-14(n) may send a request for a network shared data file using a file transfer protocol instead of a URL using the HTTP protocol.

In step 204, the requesting one of the client devices 14(1)-14(n) gets a response from the one of the server devices 16(1)-16(n) that was previously hosting the network resource, in this example the requested page A.html. The response includes a temporary redirect message (shown as an exemplary status code 302 with a message "Moved Temporarily") to a different URL http://sample.com/B.html along with a "Set-Cookie" including a cookie named "SESSION" set to value "1234".

Generally, the cookie is a string formed by the pair "name=value" (e.g., "SESSION=1234", followed by optional attributes. Although one illustrative example is described herein, this technology can be used with specifications for all cookies.

In step 206, the requesting one of the client devices 14(1)-14(n) processes the response and sends a new HTTP request to the one of the server devices 16(1)-16(n) hosting the URL http://www.sample.com/B.html.

In step 208, the requesting one of the client devices 14(1)-14(n) gets a response from the one of the server devices 16(1)-16(n) that was previously hosting the network resource, in this example the requested page B.html. The response includes another temporary redirect message, "Moved Temporarily" to a different URL http://example.com/C.html along with a "Set-Cookie" including a cookie named "LANG" set to value "EN".

In step 210, the requesting one of the client devices 14(1)-14(n) processes the response and sends another new HTTP request to the one of the server devices 16(1)-16(n) hosting the URL http://www.example.com/C.html.

In step 212, the requesting one of the client devices 14(1)-14(n) gets a response from the one of the server devices 16(1)-16(n) hosting the network resource with a status identifier message shown as status code 200 set to "OK" and the network resource can now be retrieved. Although exemplary steps 202-212 are shown, a higher or a lower number of redirections may be required by a particular request.

Figure 3:
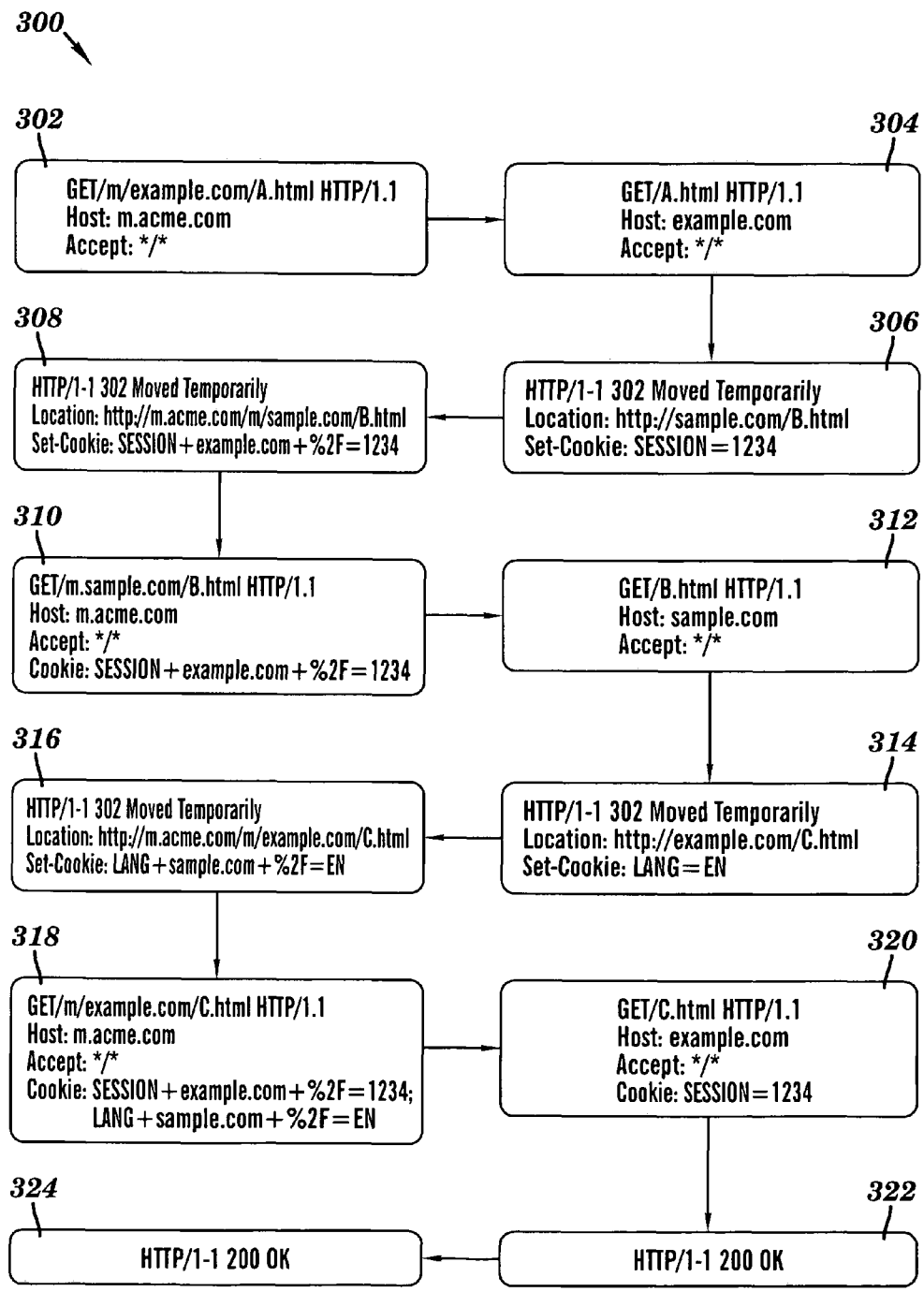
FIG. 3 is a flow chart of a method for processing an exemplary sequence of HTTP requests and responses between a client device and the web content optimization apparatus.

Referring to FIG. 3, a flow chart of a method for processing an exemplary sequence of HTTP requests and responses between one of the client devices 14(1)-14(n) and the web content optimization apparatus 12 is illustrated. In step 302, one of the client devices 14(1)-14(n) makes a request for http://m.acme.com/m/example.com/A.html which is received by the web content optimization apparatus 12.

In step 304, the web content optimization apparatus 12 generates a request for A.html at example.com which is transmitted to the one of the server devices 16(1)-16(n) thought to host the network resource.

In step 306, the web content optimization apparatus 12 receives a redirect response from the one of the server devices 16(1)-16(n) to http://sample.com/B.html and setting the cookie SESSION=1234 which is provided to the requesting one of the client devices 14(1)-14(n).

In step 308, this redirect response is optimized by the web content optimization apparatus 12 into a redirect to http://m.acme.com/m/sample.com/B.html with optimized version cookie SESSION+example.com+%2F=1234 in this example and transmitted to the requesting one of the client devices 14(1)-14(n).

In step 310, the requesting one of the client devices 14(1)-14(n) makes the next request for http://m.acme.com/m/sample.com/B.html based on the received optimized redirect response. This request is received by the web content optimization apparatus 12.

In step 312 the web content optimization apparatus 12 generates a request for document B.html on sample.com which is transmitted to the one of the server devices 16(1)-16(n) thought to currently host the network resource.

In step 314, the web content optimization apparatus 12 receives a redirect response from the one of the server devices 16(1)-16(n) to http://example.com/C.html setting the cookie LANG=EN.

In step 316, this redirect response is optimized by the web content optimization apparatus 12 into a redirect to http://m.acme.com/m/example.com/C.html with optimized version cookie LANG+sample.com+%2F=EN which is transmitted to the requesting one of the client devices 14(1)-14(n).

In step 318, the one of the client devices 14(1)-14(n) makes the next request for http://m.acme.com/m/example.com/C.html which is received by the web content optimization apparatus 12.

In step 320 the web content optimization apparatus 12 generates a request for document C.html on example.com passing the matching cookie SESSION=1234 to the one of the server devices 16(1)-16(n) thought to currently host the network resource.

In step 322, gets a response from the one of the server devices 16(1)-16(n) with a status identifier message shown as status code 200 set to "OK" indicating the network resource has been found. In step 324, the web content optimization apparatus 12 provides this response to the requesting one of the client devices 14(1)-14(n) to retrieve the located network resource.

Figure 4:
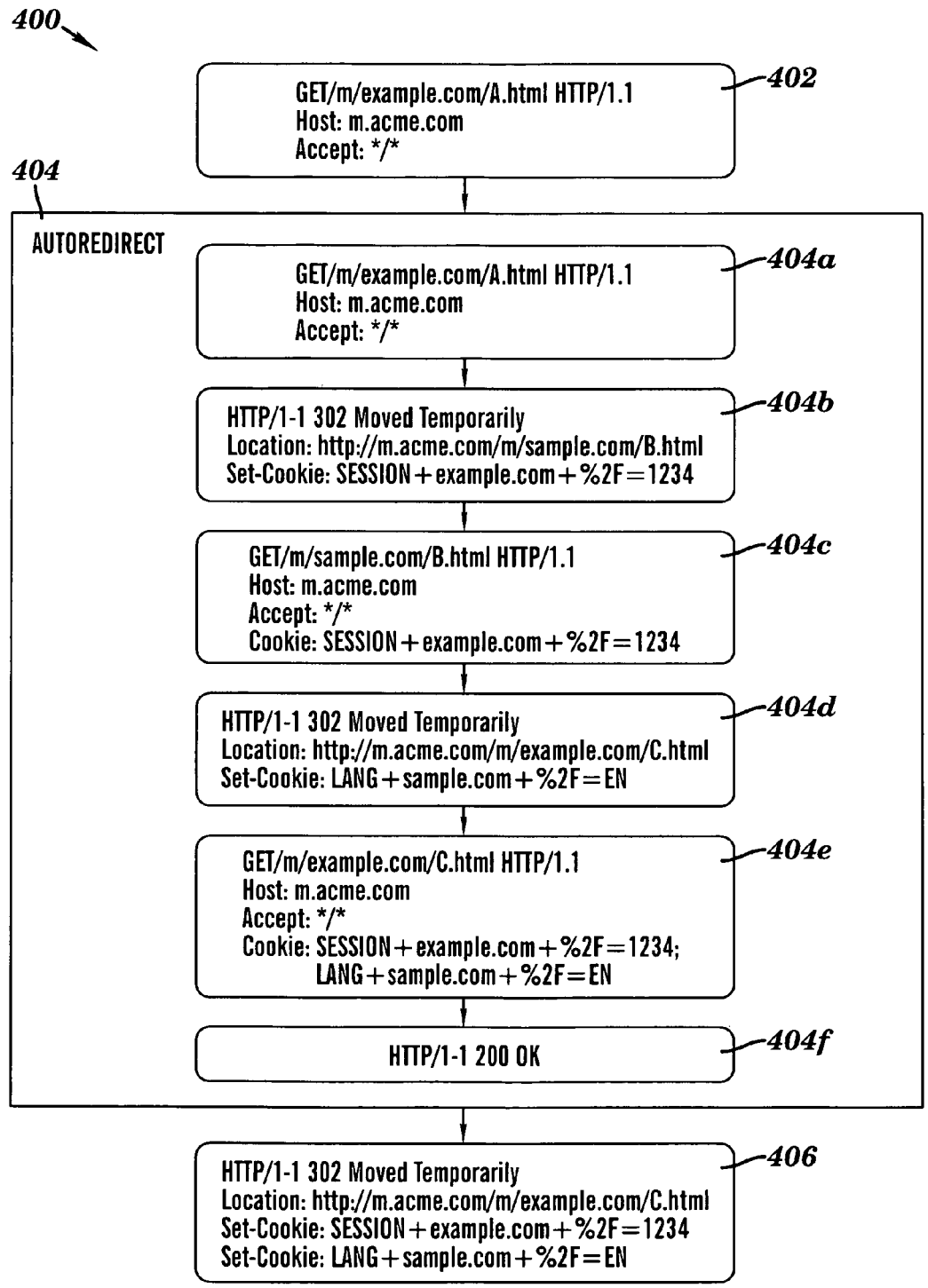
FIG. 4 is a flow chart of a method for processing an exemplary sequence of HTTP requests and responses between a client device and the web content optimization apparatus when auto redirect is enabled.

Referring to FIG. 4, an exemplary method 400 for processing an exemplary sequence of HTTP requests and responses between one of the client devices 14(1)-14(n) and the web content optimization apparatus 12 when auto redirect is enabled. In step 402, one of the client devices 14(1)-14(n), which in this example is a mobile device, makes a new request for the URL: m.acme.com/m/example.com/A.html which is received by the web content optimization apparatus 12.

In step 404, the web content optimization apparatus 12 processes the request utilizing processors 13(1) and 13(2) which act as both the requesting client device and the proxy server device as explained in greater detail below.

More specifically, in step 404a one of the processors 13(1) in the web content optimization apparatus 12 acting as the client device sends a request for /m/example.com/A.html to another one of the processors 13(2) in the web content optimization apparatus 12. The auto redirect between the processors 13(1) and 13(2) in the web content optimization apparatus 12 is turned off.

In step 404b, the other one of the processors 13(2) in the web content optimization apparatus 12 sends the request to one of the server devices 16(1)-16(n) currently identified as hosting the requested resource. The processor 13(2) in the web content optimization apparatus 12 gets a redirect response from one of the server devices 16(1)-16(n) thought to store the network resource. The processor 13(2) in the web content optimization apparatus 12 optimizes the redirect response to http://m.acme/m/sample.com/B.html, and cookie to SESSION+example.com+%2F=1234, which is provided to the processor 13(1) in the web content optimization apparatus 12 acting as the requesting client device.

In step 404c, based on the redirect response the processor 13(1) in the web content optimization apparatus 12 acting as the requesting client device sends an updated HTTP request to the processor 13(2) in the web content optimization apparatus 12 acting as the proxy server device. The processor 13(2) in the web content optimization apparatus 12 sends the updated request to the one of the server devices 16(1)-16(n) identified as hosting the network resource.

In step 404d, the processor 13(2) in the web content optimization apparatus 12 gets a redirect response from the one of the server devices 16(1)-16(n) identified as hosting the network resource based on the updated request. The processor 13(2) in the web content optimization apparatus 12 optimizes the redirect response to http://m.acme/m/sample.com/C.html, and the cookie LANG+sample.com+%2F=EN, which is provided to the processor 13(1) in the web content optimization apparatus 12 acting as the requesting client device.

In step 404e, based on the last redirect response the processor 13(1) in the web content optimization apparatus 12 acting as the requesting client device sends another updated HTTP request to the processor 13(2) in the web content optimization apparatus 12 acting as the proxy server device.

The processor 13(2) in the web content optimization apparatus 12 sends the updated request to the one of the server devices 16(1)-16(n) identified as currently hosting the network resource.

In step 404f, the processor 13(2) in the web content optimization apparatus 12 gets a response from the one of the server devices 16(1)-16(n) with a status identifier message shown as status code 200 set to "OK" indicating the network resource has been found.

In step 406, when the processor 13(1) in the web content optimization apparatus 12 gets the http://m.acme.com/m/example.com/C.html response that is a 200 (i.e. a real resource), then it creates the http response for the requesting one of the client devices 14(1)-14(n) that is a redirect to http://m.acme.com/m/example.com/C.html with the two collected cookies from steps 404b and 404d.

Figure 5:
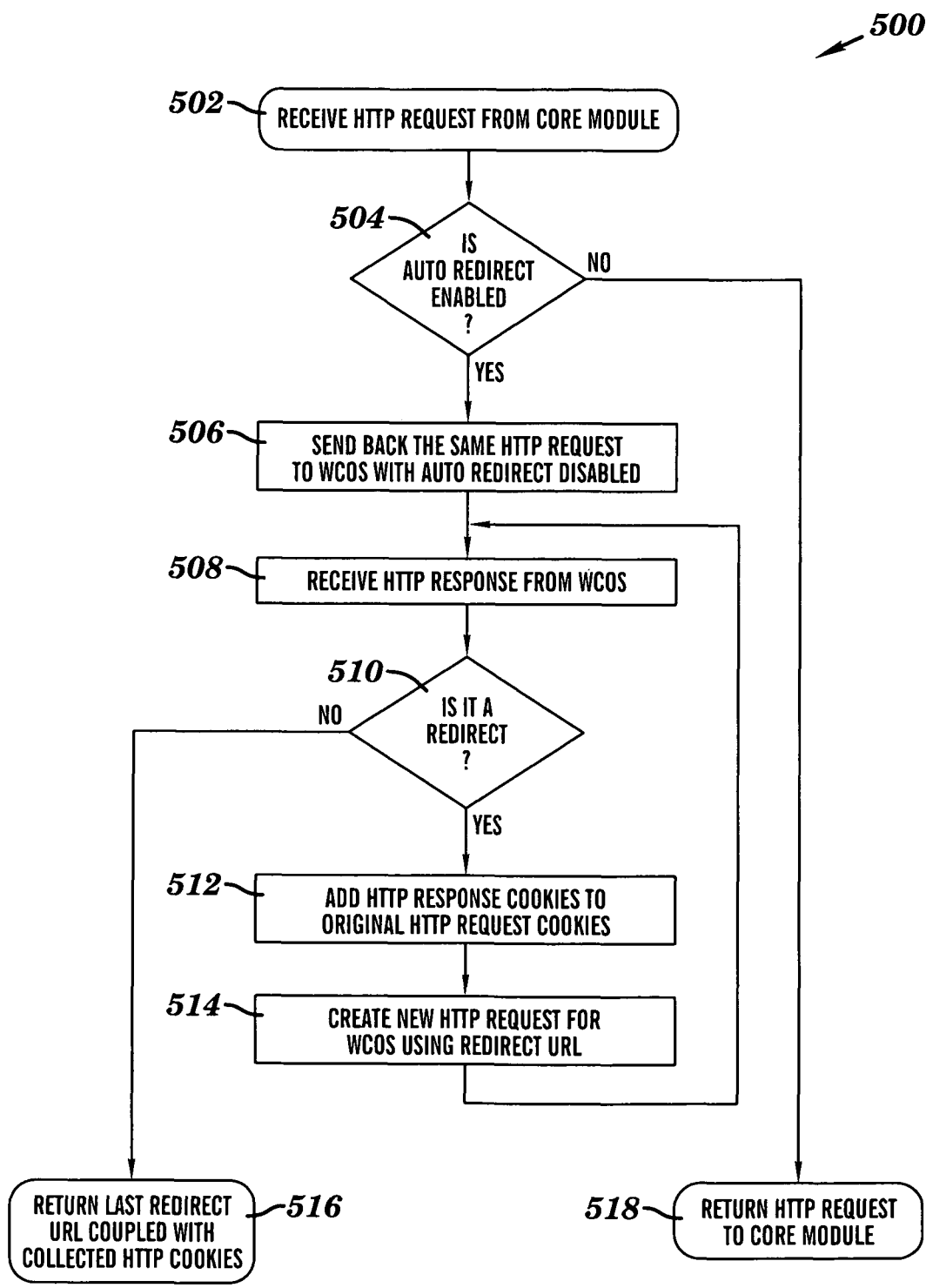
FIG. 5 is a flowchart of an exemplary method for reducing latency in network connections by optimizing network resource using automatic redirection of redirect response messages at the web content optimization apparatus.

Referring to FIG. 5, an exemplary method for reducing latency in network connections between requesting client devices 14(1)-14(n) and content hosting server devices 16(1)-16(n) is described using flowchart 500 with reference back to FIGS. 1 and 3-4. More specifically, details of operation of web content optimization apparatus 12 with respect to optimization of redirect chain 300 and 400 using core module 21 and redirect module 23 are described. Redirect module 23 is part of a web content optimization system (referred to as "WCOS," not shown) implemented in web content optimization apparatus 12 that is responsible for handling multiple content server redirect response messages from server devices 16(1)-16(n) and sending them to client devices 14(1)-14(n) that originally made the HTTP request (e.g., as shown in steps 202 and 302). In one example, only the last URL of the redirect chain 300 is handled by the redirect module 23. Core module 21 and redirect module 23 reside as part of WCOS on hardware of memory 15. Alternatively, core module 21 and 23 may be implemented at least partially in software residing on a hardware portion of memory 15. The embodiment described in FIG. 5 adds an additional layer of optimization to handling redirect chains 300 and 400 by operating upon prior already optimized requests.

The method of flowchart 500 begins in step 502 where redirect module 23 inside web content optimization apparatus 12 receives a request from core module 21, which received request was a part of a request originally received by the web content optimization apparatus 12 from the requesting one of the client devices 14(1)-14(n) (e.g., from a web browser on one of the client devices 14(1)-14(n)).

In step 504, redirect module 23 determines whether an automatic-redirect identifier or flag is enabled and was received as part of the original request for the network resource by the requesting one of the client devices 14(1)-14(n). The automatic-redirect, also referred to as "auto-redirect" herein, is a programming instruction that is used to decide which HTTP requests from client devices 16(1)-16(n) should be optimized for handling by the web content optimization apparatus 12, in accordance with the redirect chain 400 described by FIG. 4, and which requests should be handled directly by the requesting client devices 14(1)-14(n) directly, as shown by FIG. 2 with minimum processing by the web content optimization apparatus 12, although other options could be provided such as the exemplary redirect illustrated and described with reference to FIG. 3. The auto-redirect flag/identifier adds an additional level of optimization because automatic redirection by web content optimization apparatus 12 is used only when needed and when chosen by the programmer or administrator of the web content optimization apparatus 12. If the auto-redirect flag/identifier is not enabled or set to a value "false" set programmatically by a WCOS programmer, the No branch is taken in step 504, where the request is returned to core module 21 by redirect module 23, as shown in step 518. In step 518, the web content optimization apparatus 12 can process the request from the requesting one of the client devices 14(1)-14(n), send a request to one of the server devices 16(1)-16(n), and then optimize the response which is sent back to the requesting one of the client devices 14(1)-14(n).

However, if the auto-redirect flag/parameter/identifier is set to a value "true," the Yes branch is taken and the flow proceeds to step 506. In step 506, the same HTTP request is sent back to the core module 21 in WCOS with its "auto-redirect" flag set to a value "false." By way of example only, m.acme.com is the host name associated with the web content optimization system residing in memory 15 of the web content optimization apparatus 12. When the auto-redirect parameter is disabled and m.acme.com receives an exemplary request http://m.acme.com/example.com/A.html, it sends a request to http://example.com/A.html getting a redirect to http://sample.com/B.html with SESSION=1234 cookie (as shown, for example, in FIG. 2). Accordingly, m.acme.com will send response to the client device with a redirect to http://m.acme.com/sample.com/B.html with cookie modified to SESSION+example.com+%2F=1234. Modification of the cookie is explained in more detail, by way of example only, in U.S. patent application Ser. No. 12/660,637, filed Mar. 2, 2010, entitled "Method for Optimizing a Web Content Proxy Server and Devices Thereof," hereby incorporated by reference in its entirety. When core module 21 and redirect module 23 receive a request for http://m.acme.com/sample.com/B.html from the client device (e.g., client device 14(1)), a request to http://sample.com/B.html is sent and then a redirect to http://example.com/C.html with LANG=EN cookie is received that will be transformed in a redirect response to http://m.acme.com/example.com/C.html with LANG+sample.com+%2F=EN cookie, to be sent to the client web browser of the client device.

In another exemplary scenario, automatic-redirect is enabled for first request for http://m.acme.com/example.com/A.html. Since automatic-redirect is enabled, the redirect module 23 will decide to follow the redirect chain 300 making the HTTP requests internally to itself within the web content optimization apparatus 12, including all the intermediate redirection requests. Accordingly, redirect module 23 will make HTTP request to http//m.acme.com/example.com/A.html with auto redirect disabled. This way, correct optimized cookies will be collected by redirect module 23 and WCOS redirects will be followed. When all the redirect chain 400 is collected as illustrated and described with reference to FIG. 4, a redirect response to http://m.acme.com/example.com/C.html will be sent to the client browser having new cookies set to SESSION+example.com+%2F=1234 and LANG+sample.com+%2F=EN that are valid cookies for m.acme.com domain.

In step 508, the HTTP response is received by core module 21. Sending HTTP requests back to core module 21 of WCOS instead of to hosting one of the server devices 16(1)-16(n) enables the WCOS to optimize the redirect chain 400 of already optimized HTTP responses, although again other optimized redirect chains can be used as illustrated and described with reference to FIG. 3 by way of example. In some examples, core module 21 of WCOS can create longer redirect chains than original content site. By way of example only, the web content optimization system adds new redirect chains to the original server request-response flow. For example, when the web content optimization system has to simulate a complex JavaScript behavior that is available on the original web site page for JavaScript enabled browsers, on its server side JavaScript emulator. Using the auto redirect module 23 over already optimized WCOS pages can advantageously improve the WCOS performance in the web content optimization apparatus 12.

In step 510, if the response from the redirect module 23 in WCOS optimization system is a redirect response message, then the Yes branch is taken to step 512.

In step 512, a new HTTP request is created for the redirect URL and the auto-redirect flag is set to a value "false." Further, by way of example only, cookies in the header field are the result of merging the cookies set by the redirect responses with the cookies passed to the first HTTP request.

In step 514, the core module 21 will then create the appropriate HTTP response to be sent to the redirect module 23. If the HTTP response from the redirect module 23 is a redirect response, the previous steps 510-514 will be repeated one or more times.

However, in step 510, if the response is a real resource, then the No branch is taken to step 516 where the last redirect response coupled with collected response cookies in the header fields are sent back to the core module 21. By way of example only, the method of flowchart 500 is used when the requesting one of the client devices 14(1)-14(n) is a mobile client device, for example, a cellular telephone.

Accordingly, as illustrated and described herein this technology provides a number of advantages including providing a method, computer readable medium and an apparatus that reduces latency in network connections, for example, by managing handling of redirect messages from server devices 16(1)-16(n) substantially at web content optimization apparatus 12 interposed between the client devices 14(1)-14(n) and server devices 16(1)-16(n) on which various network resources are stored, which network resources are requested by client devices 14(1)-14(n). With this technology, the web content optimization apparatus 12 optimizes network resource provisioning by returning only the last redirect message along with all cookies collected from intermediate redirect messages from a chain of redirect messages from server devices 16(1)-16(n) to client devices 14(1)-14(n) for a particular network resource, thereby reducing latency in network connections between client devices and server devices.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for reducing latency in network connections, the method comprising:

receiving at an optimization device a request from one of one or more client devices for a network resource hosted at one of one or more server devices;

determining at the optimization device whether an automatic redirect parameter is enabled for the request;

sending the request from one proxy processing device acting as the requesting one of the one or more client devices within the optimization device to another proxy processing device within the optimization device when the automatic redirect parameter is determined to be enabled;

repeatedly obtaining, at the another proxy processing device within the optimization device, a redirect message with one or more optimized cookies associated with the requested network resource from the one or more server devices, sending the redirect message and the one or more optimized cookies from the another proxy processing device within the optimization device to the one proxy processing device within the optimization device, and sending from the one proxy processing device back to the another proxy processing device a new request for the requested network resource using the redirect message until the requested network resource is located; and forwarding from the one proxy processing device, when the requested network resource is located, only a last of the obtained redirect messages with the one or more optimized cookies associated with the requested network resource to the requesting one of the one or more client devices.

2. The method as set forth in claim 1 wherein the determining at the optimization device whether the automatic redirect parameter is enabled for the request is based on information contained in the request.

3. The method as set forth in claim 2, wherein the information contained in the request comprises a Uniform Resource Identifier (URI).

4. The method as set forth in claim 1 further comprising disabling the automatic redirect parameter when the request is sent from the one proxy processing device acting as the requesting one of the one or more client devices within the optimization device to the another proxy processing device within the optimization device.

5. The method as set forth in claim 1 further comprising:
processing at the optimization device a revised request for the requested network resource from the requesting one of the one or more client devices based on the last of the obtained redirect messages with the one or more optimized cookies;
obtaining network content at the optimization device from one of the one or more server devices based on the revised request;
optimizing at the optimization device the obtained network content at the optimization device for the requesting one of the one or more client devices; and
forwarding from the optimization device the optimized obtained network content to the requesting one of the one or more client devices.

6. The method as set forth in claim 5, wherein the receiving further comprises receiving at the optimization device the request from the one of the one or more client devices comprising a mobile device configured to display the optimized obtained network content on a browser of the mobile device.

7. The method as set forth in claim 1, wherein the network resource comprises one or more web pages.

8. A non-transitory computer readable medium having stored thereon instructions for reducing latency in network connections comprises machine executable code which when executed by at least one processor, causes the processor to perform steps comprising:
receiving a request from one of one or more client devices for a network resource hosted at one of one or more server devices;
determining whether an automatic redirect parameter is enabled for the request;
sending the request from one proxy processing device acting as the requesting one of the one or more client devices within an optimization device to another proxy processing device within the optimization device when the automatic redirect parameter is determined to be enabled;

repeatedly obtaining, at the another proxy processing device, a redirect message with one or more optimized cookies associated with the requested network resource from the one or more server devices, sending the redirect message and the one or more optimized cookies from the another proxy processing device to the one proxy processing device, and sending from the one proxy processing device back to the another proxy processing device a new request for the requested network resource using the redirect message until the requested network resource is located; and forwarding from the one proxy processing device, when the requested network resource is located, only a last of the obtained redirect messages with the one or more optimized cookies associated with the requested network resource to the requesting one of the one or more client devices.

9. The non-transitory computer readable medium as set forth in claim 8 wherein the determining at the optimization device whether the automatic redirect parameter is enabled for the request is based on information contained in the request.

10. The non-transitory computer readable medium as set forth in claim 9, wherein the information contained in the request comprises a Uniform Resource Identifier (URI).

11. The non-transitory computer readable medium as set forth in claim 8 further comprising:
processing a revised request for the requested network resource from the requesting one of the one or more client devices based on the last of the obtained redirect messages with the one or more optimized cookies;
obtaining network content from one of the one or more server devices based on the revised request;
optimizing the obtained network content at the optimization device for the requesting one of the one or more client devices; and
forwarding the optimized obtained network content to the requesting one of the one or more client devices.

12. The non-transitory computer readable medium as set forth in claim 10, wherein the receiving further comprises receiving the request from the one of the one or more client devices comprising a mobile device configured to display the optimized network content on a browser of the mobile device.

13. The non-transitory computer readable medium as set forth in claim 8, wherein the network resource comprises one or more web pages.

14. An apparatus configured to reduce latency in network connections comprising one or more processors and a memory coupled to the one or more processors configured to execute programmed instructions stored in the memory comprising:
receiving a request from one of one or more client devices for a network resource hosted at one of one or more server devices;
determining whether an automatic redirect parameter is enabled for the request;
sending the request from one proxy processing device acting as the requesting one of the one or more client devices within an optimization device to another proxy processing device within the optimization device when the automatic redirect parameter is determined to be enabled;

repeatedly obtaining, at the another proxy processing device, a redirect message with one or more optimized cookies associated with the requested network resource from the one or more server devices, sending the redirect message and the one or more optimized cookies from the another proxy processing device to the one proxy processing device, and sending from the one proxy processing device back to the another proxy processing device a new request for the requested network resource using the redirect message until the requested network resource is located; and forwarding from the one proxy processing device, when the requested network resource is located, only a last of the obtained redirect messages with the one or more optimized cookies associated with the requested network resource to the requesting one of the one or more client devices.

15. The apparatus as set forth in claim 14 wherein the one or more processors is further configured to execute programmed instructions stored in the memory for the determining further comprising determining at the optimization device whether the automatic redirect parameter is enabled for the request based on information contained in the request.

16. The apparatus as set forth in claim 15, wherein the information contained in the request comprises a Uniform Resource Identifier (URI).

17. The apparatus as set forth in claim 14 wherein the one or more processors is further configured to execute programmed instructions stored in the memory further comprising:

processing a revised request for the requested network resource from the requesting one of the one or more client devices based on the last of the obtained redirect messages with the one or more optimized cookies;

obtaining network content from one of the one or more server devices based on the revised request;

optimizing the obtained network content at the optimization device for the requesting one of the one or more client devices; and forwarding the optimized obtained network content to the requesting one of the one or more client devices.

18. The apparatus as set forth in claim 17, wherein the one or more processors is further configured to execute programmed instructions stored in the memory for the receiving further comprising receiving the request from the one of the one or more client devices comprising a mobile device configured to display the optimized obtained network content on a browser of the mobile device.

19. The apparatus as set forth in claim 14, wherein the network resource comprises one or more web pages.

* * * * *

UNITED STATES PATENT AND TRADEMARK OFFICE
CERTIFICATE OF CORRECTION

PATENT NO. : 8,868,638 B2  
APPLICATION NO. : 13/135707  
DATED : October 21, 2014  
INVENTOR(S) : Enrico Scoda Page 1 of 1

It is certified that error appears in the above-identified patent and that said Letters Patent is hereby corrected as shown below:

On the Title page, under the Inventor field: delete "Enrico Scoda, Matignacco (IT)" and insert -- Enrico Scoda, Martignacco (IT) --

Signed and Sealed this  
Tenth Day of February, 2015

Michelle K. Lee  
*Deputy Director of the United States Patent and Trademark Office*